A. A. BALL, Jr.
BRAKE MECHANISM.
APPLICATION FILED NOV. 14, 1908.
1,107,642.
Patented Aug. 18, 1914.
3 SHEETS—SHEET 1.
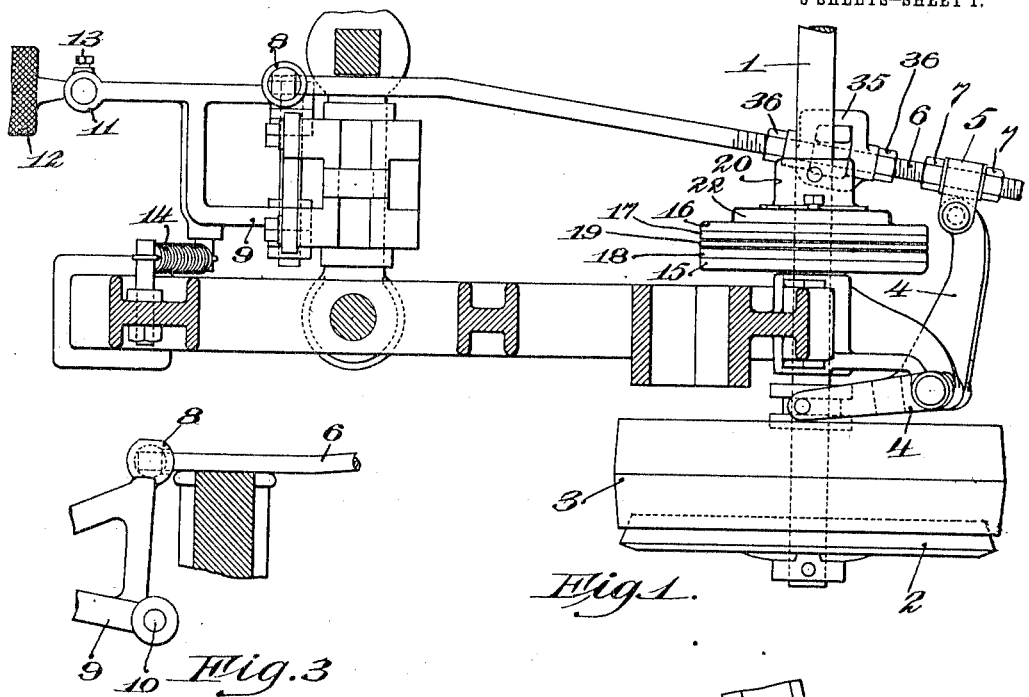
Fig. 1.
Fig. 3.
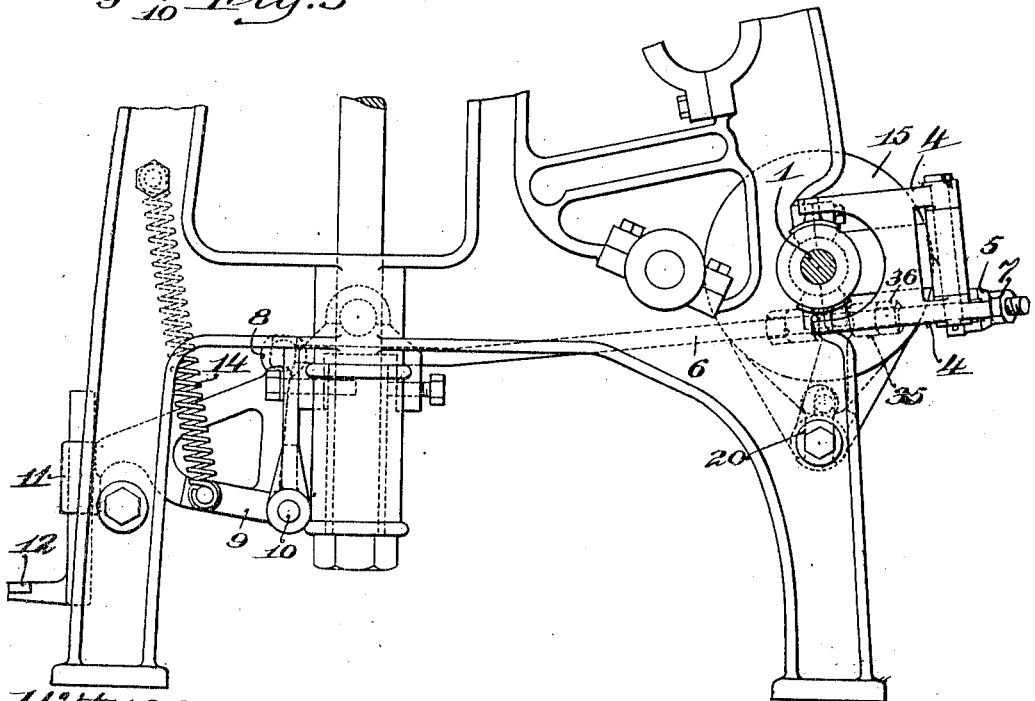
Fig. 2.
Witnesses
Edward S. Ivey
M. L. Gilman
Inventor
Augustus A. Ball Jr.
by his Attorneys
Phillips Van Everen & Fish A. A. BALL, Jr.
BRAKE MECHANISM.
APPLICATION FILED NOV. 14, 1908.

1,107,642.

Patented Aug. 18, 1914.
3 SHEETS—SHEET 2.

Witnesses
Edward S. Day
M. L. Gilman

Inventor
Augustus A. Ball Jr.
by his Attorneys
Phillips Van Everen & Fish

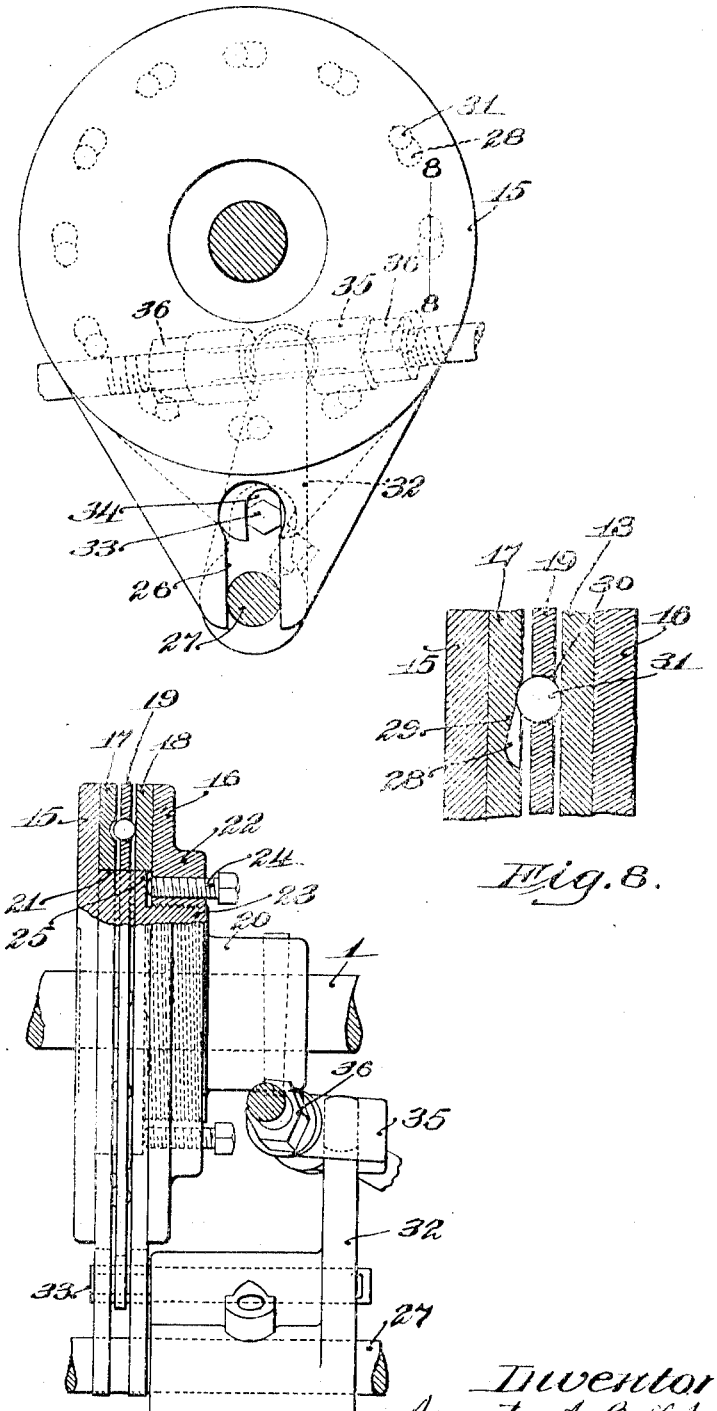

UNITED STATES PATENT OFFICE.

AUGUSTUS A. BALL, JR., OF LYNN, MASSACHUSETTS, ASSIGNOR TO UNITED SHOE MACHINERY COMPANY, OF PATERSON, NEW JERSEY, A CORPORATION OF NEW JERSEY.

BRAKE MECHANISM.

1,107,642.  Specification of Letters Patent.  Patented Aug. 18, 1914.

Application filed November 14, 1908. Serial No. 462,666.

*To all whom it may concern:*

Be it known that I, AUGUSTUS A. BALL, Jr., citizen of the United States, residing at Lynn, in the county of Essex and State of Massachusetts, have invented certain new and useful Improvements in Brake Mechanism; and I do hereby declare the following to be a full, clear, and exact description of the invention, such as will enable others skilled in the art to which it appertains to make and use the same.

The invention relates to brake mechanism, and more especially to brake mechanism adapted for use upon that class of shoe machinery in which the driving mechanism is thrown into operation manually, as by means of a treadle or similar device, and in which a friction brake is employed for stopping the machine when the driving mechanism is thrown out of operation.

It is the object of the invention to provide a brake mechanism having an improved construction and arrangement of parts, and an improved mode of operation whereby an effective braking friction may be applied with a minimum movement of the actuating parts, and with comparatively little exertion on the part of the operator.

It is a further object of the invention to provide a friction brake, the parts of which may be compactly arranged and readily applied to the shaft or other rotary member which is to be braked, and are so constructed and arranged that their operation will not be materially affected by inaccuracies of construction or by variations in the position or movements of the shaft.

To these ends the invention consists in the features and combinations hereinafter described and set forth in the claims, the advantages of which will be obvious to those skilled in the art.

The various features of the invention will be readily understood from an inspection of the accompanying drawings, in which—

Figure 4:
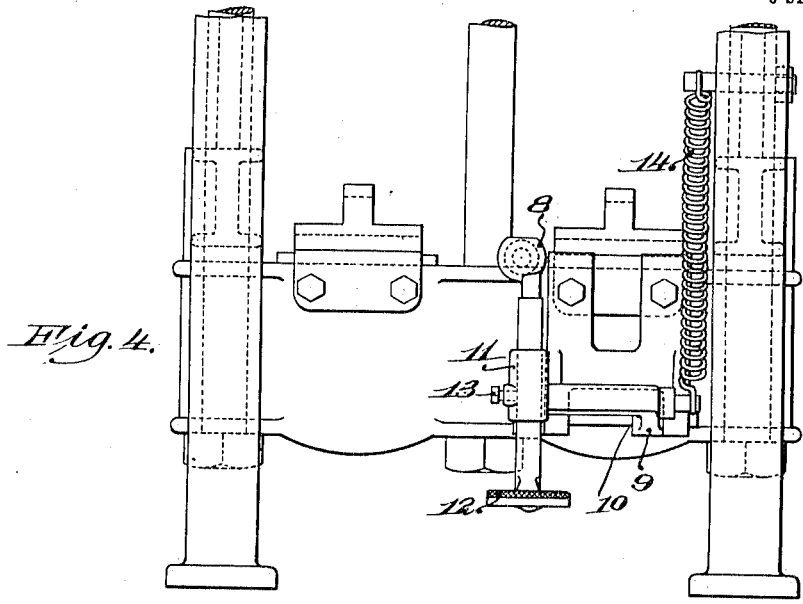
Figure 5:
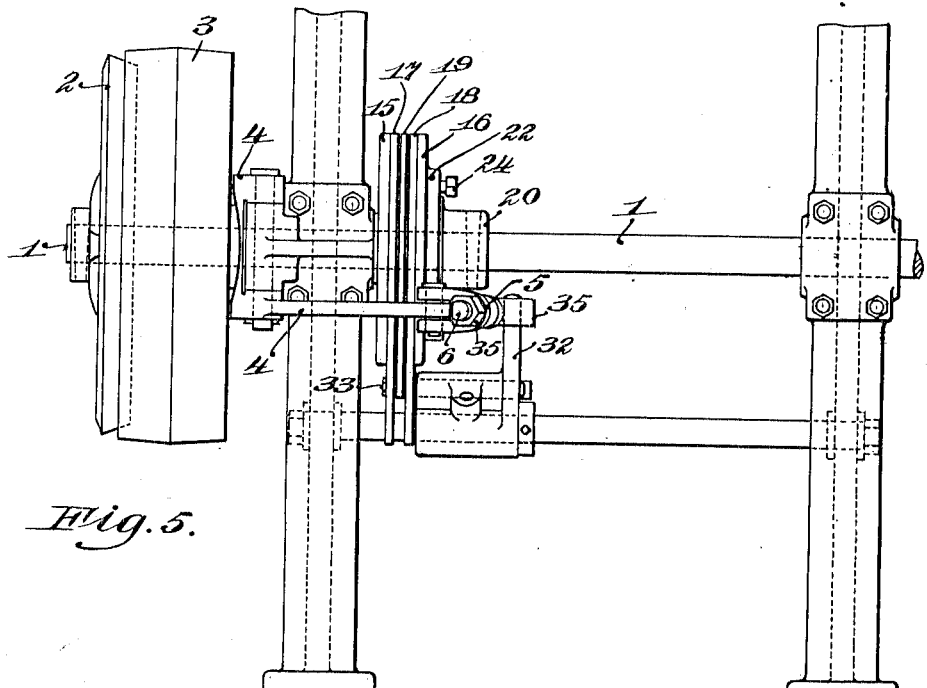

Figure 1 is a sectional plan view showing a braking mechanism embodying the various features of the invention in their preferred form; Fig. 2 is a side elevation of the device shown in Fig. 1; Fig. 3 is a detail showing one of the treadle connections; Fig. 4 is a front elevation looking from left to right in Fig. 2; Fig. 5 is a rear elevation looking from right to left in Fig. 2; Fig. 6 is an enlarged detail showing parts of the braking mechanism in elevation; Fig. 7 is an enlarged sectional elevation looking from right to left in Fig. 6; and Fig. 8 is a sectional detail on line 8—8, Fig. 6.

In the machine shown in the drawings the driving shaft through which the various parts of the machine are operated is indicated at 1. Motion is imparted to this shaft through a friction clutch comprising a clutch member 2 secured to the shaft, and a coöperating clutch member in the form of a pulley 3 which may be moved longitudinally on the shaft to engage or disengage the clutch. The pulley 3 is shifted to throw the driving clutch into and out of operation through a bell crank lever 4, one end of which is connected with the pulley, and the other end of which is connected with a block 5 adjustably secured upon the end of a rod 6, and held in adjusted position by the nuts 7. The front end of the rod 6 is connected by a universal joint 8 with a lever 9 which is pivoted at 10 to the frame of the machine. The front end of the lever 9 is provided with a boss 11, in which a treadle 12 is adjustably secured by means of a set screw 13. By means of this adjustable connection between the treadle and the treadle lever 9, the vertical position of the treadle may be adjusted to suit the convenience of the operator. The treadle is normally held in its raised position and the clutch held out of engagement by means of a spring 14, one end of which is connected with a fixed point on the frame, and the other end of which is connected to a treadle lever 9.

When the driving mechanism is to be thrown into operation, the operator depresses the treadle 12, and through the connections described engages the pulley 3 with the clutch member 2, so that the driving shaft 1 is driven through the belt passing over the pulley 3. The machine will continue in operation until the operator releases the treadle, when the spring 14 will act to disengage the clutch, thus throwing the driving mechanism out of operation. When the driving mechanism is thrown out of operation, the motion of the shaft is immediately arrested by the action of a friction brake which is actuated through the movement of the rod 6. The friction brake in the form shown consists of two friction disks 15 and 16 secured to rotate with the shaft 1, and two stationary friction disks 17 and 18, and a spreading ring or disk 19 arranged between the stationary disks, the stationary disk and spreading disk being provided with engaging surfaces so shaped that the stationary disks are forced apart when the spreading disk is moved in one direction, and are allowed to move toward each other when the spreading disk is moved in the opposite direction. The disk 15, as shown, is in the form of a flange formed on a pulley 20 which is secured to the shaft 1. At the base of the flange 15 the pulley is provided with a cylindrical bearing surface 21 for supporting the disks 17, 18 and 19 which are mounted upon the bearing, so that the bearing may revolve freely within the disks. The disk 16 is formed on a ring 22 which is screwed on to the hub 23 of the pulley, as indicated in Fig. 7. The position of the ring 22 on the pulley is determined by the stop screws 24, which engage an annular shoulder 25 on the pulley. By adjusting the screws and turning the ring 22 on the head 23, the distance between the disks 15 and 16 may be adjusted to compensate for wear, and to secure the proper frictional engagement of the braking disks. The stationary disks 17 and 18 are provided at their lower ends with radially extending slots 26, which are engaged by a fixed bar 27 arranged parallel to the shaft 1. The bar 27 thus holds the disks from rotation, while allowing them to move in any other direction to accommodate themselves to variations in the movements of the shaft 1 which may occur by reason of wear or inaccuracies in the construction of the machine.

For convenience in manufacture, the surfaces through which the stationary disks are forced against the rotary disks upon the movement of the disk 19 are constructed in the manner indicated in the drawings. As shown, the stationary disk 17 is provided with a series of recesses 28, presenting surfaces 29 which are inclined to the opposing surface of the disk 18. The disk 19 is provided with a series of recesses 30 arranged to register with the recesses 28, and balls 31 are carried in the recesses 30. The balls are of such a diameter that they will lie loosely between the opposing surfaces of the disks 17 and 18 when they are in register with the deeper parts of the recesses 28, but will act against the opposing surfaces of the disks 17 and 18 to force the disks apart when they are moved up the inclined surface 29. By giving the disk 19 a slight rotary movement, therefore, an efficient wedging action will be produced which will move the disks 17 and 18 away from each other, and forcibly press them against the rotary disks 15 and 16.

The spreader disk 19 is rocked to apply or release the brake through a lever 32 mounted on the bar 27, and provided with a pin 33, the end of which engages a radial slot 34 formed in the disk 19. The upper end of the lever 32 projects through an opening formed in a collar 35, which is adjustably secured upon the rod 6 by means of nuts 36. By this connection the disk 19 is moved by the depression of the treadle to bring the balls 31 into the deeper part of the recesses 28, so that the stationary disks 17 and 18 are free to ride away from the rotary disks 15 and 16, and do not interfere with the rotation of the driving shaft. When the operator releases the treadle and the driving clutch is disengaged, the disk 19 is rocked in the opposite direction, thus moving the balls 31 up the inclines 29 of the recesses 28, and forcing the stationary disks 17 and 18 against the rotary disks 15 and 16 to stop the rotation of the shaft.

By arranging the actuating disk between stationary disks or surfaces, and providing surfaces which will produce a wedging action upon a rotation of the actuating disk, a heavy braking friction may be secured between the stationary and rotary disks by a very slight movement of the actuating disk, and by the application of but little force to the treadle through which the disk is rocked. A very slight movement and the application of comparatively little force to the operating treadle is also required to move the actuating disk in the opposite direction in relieving the frictional grip between the stationary and rotary disks. A highly efficient braking action is thus secured with comparatively little movement of the part which is operated by the operator, and with comparatively little exertion on his part. By providing stationary disks for engaging the oppositely facing surfaces of a rotary disk or disks, the area of the engaging friction surfaces is increased, and a more effective braking secured. The area of the engaging friction surfaces may be further increased by further increasing the number of rotary and stationary disks.

While it is preferred to employ the specific construction and arrangement of parts shown and described, it will be understood that this is not essential to the invention in its broader aspects, and that the construction and arrangement of the parts may be variously modified and changed without departing from the invention.

Having set forth the nature and object of the invention, and specifically described one form of apparatus in which it may be embodied, what I claim is:—

1. A brake mechanism, having, in combination, a rotary member provided with oppositely facing friction surfaces, stationary brake members provided with coöperating friction surfaces, a non-rotating actuating member engaging two stationary brake members through surfaces formed to force the stationary and rotary members together upon relative movement in one direction, and to relieve the pressure between the friction members upon relative movement in the opposite direction, and means for rocking the actuating member about the axis of the rotary member, substantially as described.

2. A brake mechanism, having, in combination, a rotary member provided with oppositely facing friction surfaces, stationary brake members provided with friction surfaces coöperating with the friction surfaces on the rotary member, and with opposed surfaces for engaging an actuating member, a non-rotating actuating member arranged between said opposed surfaces, and means for rocking the actuating member about the axis of the rotary member to force the opposed surfaces apart and the friction surfaces of the rotary and stationary members together, substantially as described.

3. A brake mechanism, having, in combination, friction disks connected to rotate with the part to be braked, stationary friction disks, a non-rotating spreading device between two stationary disks, and means for rocking the spreading device about the axis of the friction disks to force the rotary and non-rotary disks together or to relieve the pressure between said disks, substantially as described.

4. A brake mechanism, having, in combination, two friction disks connected to rotate with the part to be braked, two stationary friction disks between the rotary disks, a non-rotating spreader disk, coöperating wedging surfaces being provided between the spreader disk and stationary disk, and means for rocking the spreader disk about the axis of the rotary disks, substantially as described.

5. A brake mechanism, having, in combination, two friction disks connected to rotate with the part to be braked, two stationary friction disks between the rotary disks, wedging surfaces on the opposed surfaces of the stationary disks, a non-rotating disk mounted between the stationary disks and provided with openings registering with the wedging surfaces, balls in said openings engaging the wedging surfaces, and means for rocking the ball carrying disk, substantially as described.

6. A brake mechanism, having, in combination, a rotary member provided with two friction disks, two braking disks mounted on the rotary member between said friction disks, means for preventing rotation of the braking disks, a non-rotating spreader disk mounted on the rotary member between the braking disks, and means for rocking the spreader disk, substantially as described.

7. A brake mechanism, having, in combination, a rotary member provided with two friction disks, two braking disks mounted on the rotary member between the friction disks and provided with slots, a fixed bar arranged parallel to the axis of the rotary member and engaging said slots, and means for actuating the braking disks, substantially as described.

In testimony whereof I affix my signature, in presence of two witnesses.

AUGUSTUS A. BALL, Jr.

Witnesses:
 FRED O. FISH,
 M. L. GILMAN.